US 11,900,701 B2

(12) United States Patent
Okatani et al.

(10) Patent No.: US 11,900,701 B2
(45) Date of Patent: Feb. 13, 2024

(54) LEFT OBJECT DETECTION DEVICE AND LEFT OBJECT DETECTION METHOD

(71) Applicant: Hitachi, Ltd., Tokyo (JP)

(72) Inventors: Hiroshi Okatani, Tokyo (JP); Hiroaki Koiwa, Tokyo (JP); Noriharu Amiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 17/435,177

(22) PCT Filed: Mar. 1, 2019

(86) PCT No.: PCT/JP2019/008252
§ 371 (c)(1),
(2) Date: Aug. 31, 2021

(87) PCT Pub. No.: WO2020/178926
PCT Pub. Date: Sep. 10, 2020

(65) Prior Publication Data
US 2022/0148322 A1    May 12, 2022

(51) Int. Cl.
*G06V 20/66* (2022.01)
*G06V 20/59* (2022.01)
(Continued)

(52) U.S. Cl.
CPC .............. *G06V 20/66* (2022.01); *G06V 20/59* (2022.01); *G06V 40/10* (2022.01); *G08B 21/182* (2013.01); *G08B 21/24* (2013.01)

(58) Field of Classification Search
CPC ........ G06V 20/66; G06V 20/59; G06V 40/10; G08B 21/182; G08B 21/24; H04N 7/188
See application file for complete search history.

(56) References Cited

U.S. PATENT DOCUMENTS

2008/0158361 A1    7/2008  Itoh et al.
2012/0183177 A1*   7/2012  Ku ........................ G06T 7/155
                                                                382/103
(Continued)

FOREIGN PATENT DOCUMENTS

JP    2008-104130 A    5/2008
JP    2012-235300 A    11/2012
(Continued)

OTHER PUBLICATIONS

International Search Report (PCT/ISA/210) issued in PCT Application No. PCT/JP2019/008252 dated May 28, 2019 with English translation (three (3) pages).
(Continued)

*Primary Examiner* — Ming Y Hon
(74) *Attorney, Agent, or Firm* — Crowell & Moring LLP (57) ABSTRACT

A left object detection device for detecting an object left behind in a monitoring target area includes an acquisition section which acquires an image of the area from an image pickup device for picking up an image of the monitoring target area, a processing section, and an output section which outputs in accordance with a result of the processing section. Upon detection of the object which has been kept static for a given time period as an article from the image acquired by the acquisition section, the processing section starts a timer for counting time from detection of the article, determines whether or not a person who owned the article matches a person in the image acquired by the acquisition section, stops the timer upon determination that they match, and does not stop the timer upon determination that they do not match. The processing section determines whether or not the timer counts in excess of a predetermined time period. Upon determination made by the processing section that the timer (Continued)

counts in excess of the predetermined time period, the output section outputs an existence of the left object.

8 Claims, 6 Drawing Sheets

(51) Int. Cl.
*G06V 40/10* (2022.01)
*G08B 21/18* (2006.01)
*G08B 21/24* (2006.01)

(56) References Cited

U.S. PATENT DOCUMENTS

| | | | | |
|---|---|---|---|---|
| 2015/0145956 A1* | 5/2015 | Hayakawa | ............ | G08G 1/166 348/148 |
| 2015/0169958 A1* | 6/2015 | Lee | ............ | G06V 20/52 382/103 |
| 2016/0332535 A1* | 11/2016 | Bradley | ............ | G08B 21/24 |
| 2019/0197196 A1* | 6/2019 | Yang | ............ | G06F 30/00 |
| 2019/0259165 A1* | 8/2019 | Watanabe | ............ | G08B 21/22 |
| 2019/0362161 A1* | 11/2019 | Hayashi | ............ | G06V 20/56 |
| 2020/0005044 A1* | 1/2020 | Nakamura | ............ | G06V 20/52 |
| 2020/0066136 A1* | 2/2020 | Le | ............ | G01S 17/04 |
| 2020/0193166 A1* | 6/2020 | Russo | ............ | G06V 20/52 |
| 2021/0027068 A1* | 1/2021 | Gayatri | ............ | H04N 7/188 |
| 2021/0209927 A1* | 7/2021 | Hedges | ............ | G08B 25/005 |
| 2023/0169658 A1* | 6/2023 | Rhodes | ............ | H04N 5/272 382/164 |

FOREIGN PATENT DOCUMENTS

| | | |
|---|---|---|
| JP | 2013-131153 A | 7/2013 |
| JP | 2018-42270 A | 3/2018 |
| JP | 2018-56908 A | 4/2018 |

OTHER PUBLICATIONS

Japanese-language Written Opinion (PCT/ISA/237) issued in PCT Application No. PCT/JP2019/008252 dated May 28, 2019 (five (5) pages).

Extended European Search Report issued in European Application No. 19918348.4 dated Sep. 13, 2022 (nine (9) pages).

Mohammed et al., "Automated Surveillance of Unattended Bags for Complex Situations," 2009 International Conference on Advances in Computing Control, & Telecommunication Technologies, Dec. 28, 2009, pp. 850-852, ACT '09. International Conference on, IEEE, Piscataway, NJ, USA, XP031597568 (three (3) pages).

* cited by examiner

| DISTRIBUTION DEVICE | PLACE | INFORMATION TYPE |
|---|---|---|
| 261 | CENTRAL COMMAND OFFICE | VEHICLE OPERATION SCHEDULE INFORMATION |
| | | VEHICLE OPERATION RECORD INFORMATION |
| | | IN-VEHICLE CONGESTION INFORMATION |
| 262 | WORK-SIDE FACILITY | BOARDING TICKET RESERVATION/PURCHASE INFORMATION |
| | | PASSENGER CHECK-IN INFORMATION |
| | | PASSENGER CHECK-OUT INFORMATION |
| | | INFORMATION ABOUT CONGESTION IN WORK-SIDE FACILITY |
| 263 | CENTRAL COMMAND OFFICE | SECURITY LEVEL INFORMATION |
| 264 | CENTRAL COMMAND OFFICE | WEATHER INFORMATION |
| 265 | CENTRAL COMMAND OFFICE | STATISTICAL INFORMATION |

LEFT OBJECT DETECTION DEVICE AND LEFT OBJECT DETECTION METHOD

TECHNICAL FIELD

The present invention relates to a left object detection device and a left object detection method, which are suitably applied to those for detecting an object left behind in a monitoring target area.

BACKGROUND ART

Conventionally, systems for monitoring left objects have been employed in stations and airports. For example, in the wide monitoring area, multiple left objects may be detected in the monitoring area at substantially the same time, or within a short period of time. In the circumstance, the monitoring staff has to determine the suspicious level or risk degree for each of those left objects. In view of the circumstances as described above, the left object monitoring system configured to reduce the burden on the monitoring staff has been proposed (see Patent Literature 1).

CITATION LIST

Patent Literature

Patent Literature 1: Japanese Patent Unexamined Patent Application Publication No. 2018-42270

SUMMARY OF INVENTION

Technical Problem

Assuming that a person who carries an object moves out of the monitoring area while leaving the object behind, and another person stays around the object, the technique as disclosed in the patent literature 1 causes the problem of failing to detect the object. Especially in the congested monitoring area, it is technologically difficult to appropriately execute the image processing for accurate detection of the left object.

Having been made in light of the above-described circumstances, the present invention proposes the left object detection device to ensure accurate detection of the left object.

Solution to Problem

In order to solve the problem, the left object detection device for detecting the object left behind in the target monitoring area is provided. The device includes an acquisition section which acquires an image of the area from an image pickup device for picking up an image of the monitoring target area, a processing section, and an output section which outputs in accordance with a result of the processing section. Upon detection of the object which has been kept static for a given time period as an article from the image acquired by the acquisition section, the processing section starts a timer for counting time from detection of the article, determines whether or not a person who owned the article matches a person in the image acquired by the acquisition section, stops the timer upon determination that they match, and does not stop the timer upon determination that they do not match. The processing section determines whether or not the timer counts in excess of a predetermined time period. Upon determination made by the processing section that the timer counts in excess of the predetermined time period, the output section outputs an existence of the left object.

If the person located around the monitoring object is not the person who owned the monitoring object, the structure is configured not to stop the timer. Accordingly, it is possible to avoid overlooking of the left object even in the congested state. This makes it possible to lower non-detection error.

Advantageous Effects of Invention

The present invention attains the highly reliable left object detection device.

DESCRIPTION OF EMBODIMENTS

An embodiment of the present invention will be described referring to the drawings.

(1) First Embodiment

Figure 1:
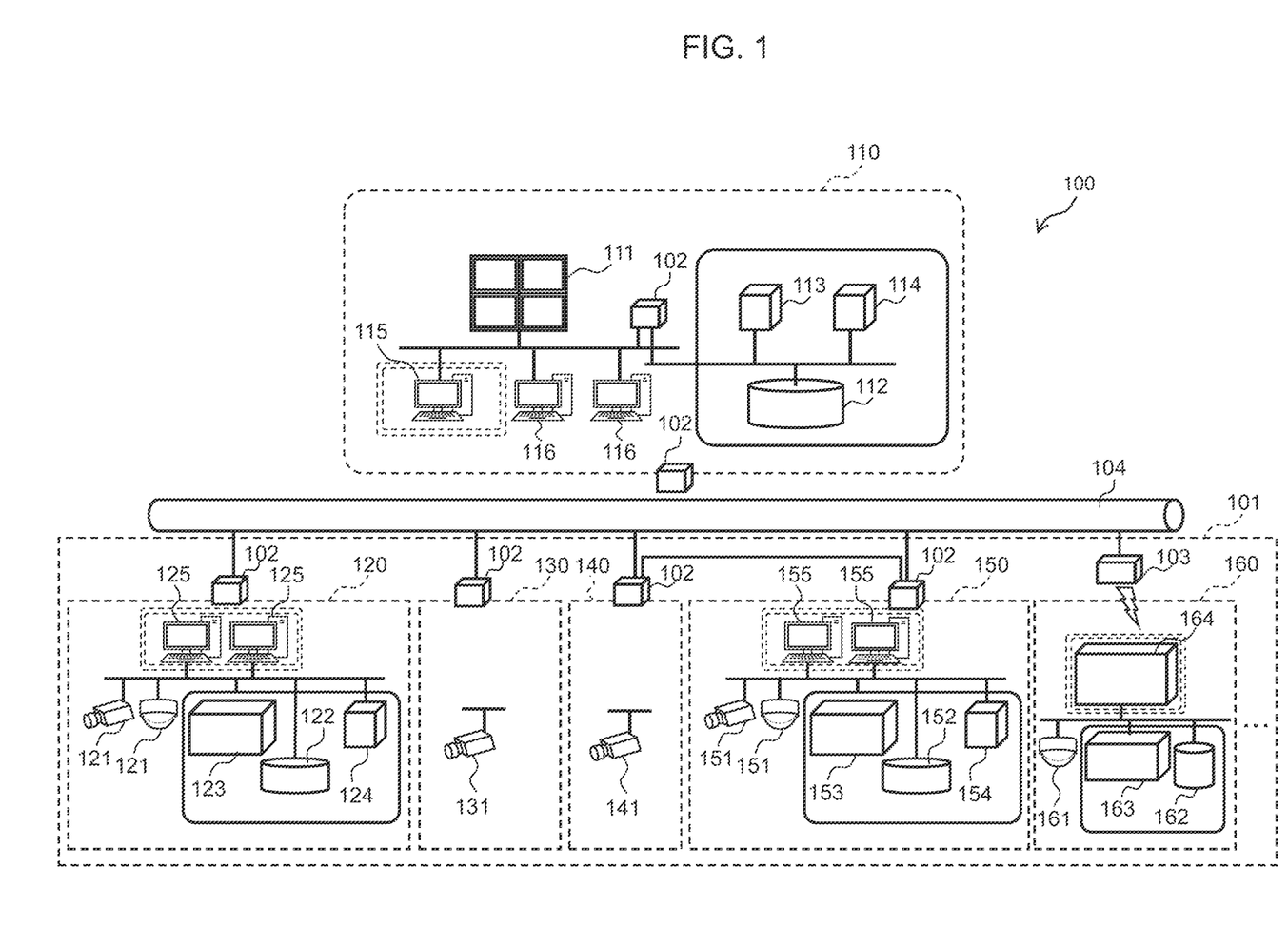
FIG. 1 illustrates an exemplary structure of a left object detection system.

Referring to FIG. 1, a reference numeral 100 refers generally to a left object detection system according to a first embodiment.

FIG. 1 illustrates an example of a structure of the left object detection system 100.

In the left object detection system 100, a network 104 communicatively connects an operation management center 110 and a facility 101 that involves targets (monitoring targets) for detecting the left object via a router 102 and/or a wireless base station 103.

The operation management center 110 includes one or more display devices 111, one or more NVRs (Network Video Recorder) 112, one or more security management servers 113, one or more central operation servers 114, one or more user terminals 115, and one or more workstations 116.

The display device 111 is capable of displaying information about the left object. The NVR 112 is a storage device which can store video data (picked-up image) taken by cameras 121, 131, 141, 151, 161 which are disposed in the monitoring target facility 101. The security management server 113 executes processes that involve security by analyzing the video data, and receiving analysis results of analysis servers 123, 153, 163 which are disposed in the monitoring target facility 101. The central operation server 114 is a computer for managing operations performed in the monitoring target facility 101. The user terminal 115 is a human machine interface. The workstation 116 is a computer that executes the high-speed processing for specific usage.

The monitoring target facility 101 includes a distribution center 120, a substation 130, a tunnel 140, a station 150, an airplane 160, and the like. The monitoring target facility 101 is not limited to those as described above, but may be an arbitrary area (facility). The facility that possibly causes congestion may be the monitoring target facility, for example, street, evacuation passage, airport, port, bus terminal, theme park, shopping center, hotel, casino, or the like.

The distribution center 120 includes one or more cameras 121, one or more NVRs 122, one or more analysis servers 123, one or more operation servers 124, and one or more user terminals 125.

The camera 121 is capable of taking an image of the inside of the distribution center 120. The NVR 122 stores (records) video data taken by the camera 121. The analysis server 123 analyzes the video data taken by the camera 121. The operation server 124 is a computer for executing operations that involve distribution. The user terminal 125 is a human machine interface. The analysis server 123 may be configured to analyze the video data taken by the cameras 131, 141.

The substation 130 includes one or more cameras 131 each capable of taking an image of the inside of the substation 130. The video data taken by the camera 131 are transmitted to a specified NVR (for example, prescribed NVR, the lowest communication-costed NVR connected to the network 104), and stored therein.

The tunnel 140 includes one or more cameras 141 capable of taking an image of the inside of the pit of the tunnel 140. The video data taken by the camera 141 are transmitted to the predetermined NVR, and stored therein.

The station 150 includes one or more cameras 151, one or more NVRs 152, one or more analysis servers 153, one or more operation servers 154, and one or more user terminals 155.

The camera 151 is capable of taking an image of inner premises of the station 150. The NVR 152 stores the video data taken by the camera 151. The analysis server 153 analyzes the video data taken by the camera 151. The operation server 154 is a computer for implementing operations that involve passengers, freight and the like. The user terminal 155 is a human machine interface. The analysis server 153 may be configured to analyze the video data taken by the cameras 131, 141.

The airplane 160 includes one or more cameras 161 each capable of taking an image of the inside of the airplane 160, one or more NVRs 162 for storing the video data taken by the camera 161, one or more analysis servers 163 for analyzing the video data, and one or more display devices 164 capable of displaying various kinds of information.

The left object may be detected by the analysis servers 123, 153, 163 which are installed in the monitoring target facility 101. In the case of securing sufficient communication band of the network 104, the left object may be detected concentratedly by the security management server 113. Additionally, if the analysis server is not installed in the monitoring target facility 101, the left object may be detected by the security management server 113, or the prescribed analysis server.

Figure 2:
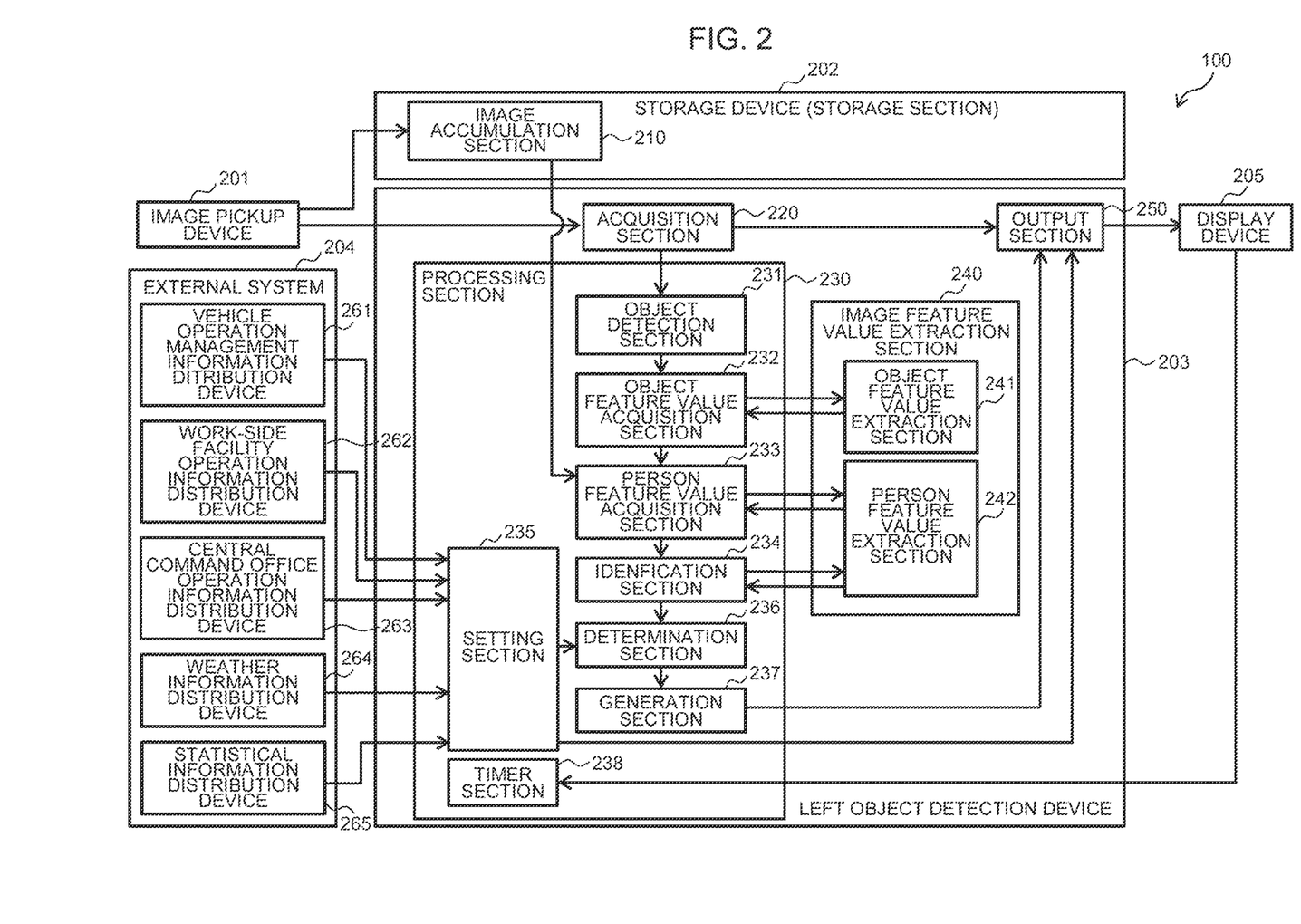
FIG. 2 illustrates an exemplary function structure of the left object detection system.

FIG. 2 illustrates an exemplary function structure of the left object detection system 100.

As FIG. 2 illustrates, in the left object detection system 100, an image pickup device 201 transmits the picked-up video data to a storage device 202 and a left object detection device 203. The storage device 202 stores (accumulates) the video data, and transmits the stored video data to the left object detection device 203. The left object detection device 203 detects the left object using the video data (real-time video data) transmitted from the image pickup device 201, the video data (past video data) transmitted from the storage device 202, and the data transmitted from an external system 204. The information about the detected left object is transmitted to a display device 205.

The image pickup device 201 is exemplified by a digital camera, video camera, network camera, for example, the cameras 121, 131, 141, 151, 161. The image pickup device 201 picks up an image of an area (monitoring area) of the place where it is disposed to transmit the picked-up video data to the storage device 202, and to the left object detection device 203. The video data may be of arbitrary format so long as they can be used for recognizing the picked-up object. For example, the video data may be moving image data taken by the video camera, and a series of still images taken by the still camera at predetermined intervals.

The storage device 202 is a storage section such as a computer that incorporates the HDD (Hard Disk Drive), NAS (Network Attached Storage), and the storage system connected with the network such as SAN (Storage Area Network). The storage device 202 is exemplified by the NVRs 112, 122, 152, 162. The storage device 202 includes an image accumulation section 210. The image accumulation section 210 accumulates the video data transmitted from the image pickup device 201 in a not shown HDD. For example, the image accumulation section 210 transmits the stored video data in response to a request from the left object detection device 203.

Functions of the storage device 202 (image accumulation section 210 in this example) may be implemented by the CPU (Central Processing Unit) for executing the program in the RAM (Random Access Memory) which has been read out from the ROM (Read Only Memory) (software). The function may be implemented by hardware such as the dedicated circuit, and by combining software with hardware.

The left object detection device 203 is a computer including the controller such as the CPU, the storage device such as ROM, RAM, HDD, and the communication device for communication with the outside. The left object detection device 203 is exemplified by the security management server 113, and the analysis servers 123, 153, 163. The left object detection device 203 includes an acquisition section 220, a processing section 230, an image feature value extraction section 240, and an output section 250.

The acquisition section 220 acquires (for example, receives) video data picked up by the image pickup device 201. The acquisition section 220 converts the video data acquired from the image pickup device 201 into data format used within the left object detection device 203. For example, the acquisition section 220 executes decomposition of the video data (moving image data format) into frames (still image data format), and notifies the processing section 230 of the decomposed frames (picked-up image).

The processing section 230 includes an object detection section 231, an object feature value acquisition section 232, a person feature value acquisition section 233, an identification section 234, a setting section 235, a determination section 236, a generation section 237, and a timer section 238.

The object detection section 231 detects an appeared object with a predetermined rectangular size on the picked-up image, and traces the object among the picked-up images for each appeared object.

If there is the object kept static (not displaced for a fixed time) in a period in excess of predetermined time (for example, approximately 5 to 10 seconds) among those detected by the object detection section 231, the picked-up image of the object, and the object position information are transmitted to an object feature value extraction section 241. The object feature value acquisition section 232 receives the object feature value from the object feature value extraction section 241 to determine whether or not the object is a monitoring object.

The person feature value acquisition section 233 acquires past picked-up images of the article (monitoring article) determined as the monitoring object by the object feature value acquisition section 232 from the image accumulation section 210, and traces the locus of the monitoring article. The picked-up image indicating the state where the monitoring article was left behind, and the position information of the monitoring article to a person feature value extraction section 242. The person feature value acquisition section 233 receives the feature value of the person located around the monitoring article at the time when it appeared in the monitoring area from the person feature value extraction section 242.

The identification section 234 performs segmentation of the image of the person approaching the position around the monitoring article in the monitoring area from the picked-up images transmitted from the image pickup device 201, and transmits the segmented image to the person feature value extraction section 242. The identification section 234 acquires the feature value of the person approaching the position around the monitoring article in the monitoring area from the person feature value extraction section 242 to collate the feature value (feature value of the person located around the object) acquired from the person feature value extraction section 242 with the feature value (feature value of the owner of the left object) acquired from the person feature value acquisition section 233.

The setting section 235 acquires information from the external system 204, sets a threshold value of a time period for determination of the left object, and suppresses the system operation.

If there is no displacement of the monitoring article in the monitoring area between the picked-up images upon elapse of time as the threshold value set by the setting section 235, and there is no person with the feature value of the owner of the left object, the determination section 236 determines that the monitoring article is the left object, and sets an alarm flag.

Based on the determination result of the determination section 236, the generation section 237 generates progress information on the left object after its appearance in the monitoring area (position information indicating the left object position, time information indicating the time elapsing from the appearance of the left object).

The timer section 238 sets (starting or stopping) the timer for counting the time elapsed from an act of leaving the monitoring article, and releases the alarm flag set by the determination section 236.

The image feature value extraction section 240 includes the object feature value extraction section 241 and the person feature value extraction section 242.

The object feature value extraction section 241 extracts (acquires) the feature value of the object in the picked-up image. It is possible to employ one or more combinations of numerical values indicating color, gradation, outline, and frequency spectrum derived from Fourier-transformation applied to the picked-up image as the feature value of the object. Additionally, arbitrary feature values may be employed so long as they can be extracted from the picked-up images. It is also possible to employ any other known feature values different from those exemplified.

The person feature value extraction section 242 extracts (acquires) the feature value of the person in the picked-up image. It is possible to employ one or more combinations of numeral values indicating color and outline of the feature part such as an upper half of the body, head, face, and shoulder as the feature value of the person. Additionally, arbitrary feature values may be employed so long as they can be extracted from the picked-up images. It is also possible to employ any other known feature values different from those exemplified.

The output section 250 generates screen information for displaying the information about the person feature value acquired in the determination section 236 based on the progress information generated in the generation section 237, and transmits the information to the display device 205.

Functions of the left object detection device 203 (acquisition section 220, processing section 230, image feature value extraction section 240, output section 250, and the like) may be implemented by the CPU (exemplified by the processor section) for executing the program in the RAM (software) which has been read out from the ROM. The function may be implemented by hardware such as the dedicated circuit, and by combining software with hardware. The image pickup device 201, the storage device 202, the display device 205, or any other computers which can be communicated with the left object detection device 203 may be employed to entirely or partially implement functions of the left object detection device 203.

The external system 204 includes one or more external systems communicable with the left object detection system 100. The external system 204 includes a vehicle operation management information distribution device 261, a workside facility operation information distribution device 262, a central command office operation information distribution device 263, a weather information distribution device 264, and a statistical information distribution device 265.

The display device 205 is exemplified by a CRT, an LC display, a plasma display, and an organic EL (Electronic Luminescent) display, for example, the display devices 111, 164, and the user terminals 115, 125, 155.

Figure 3:
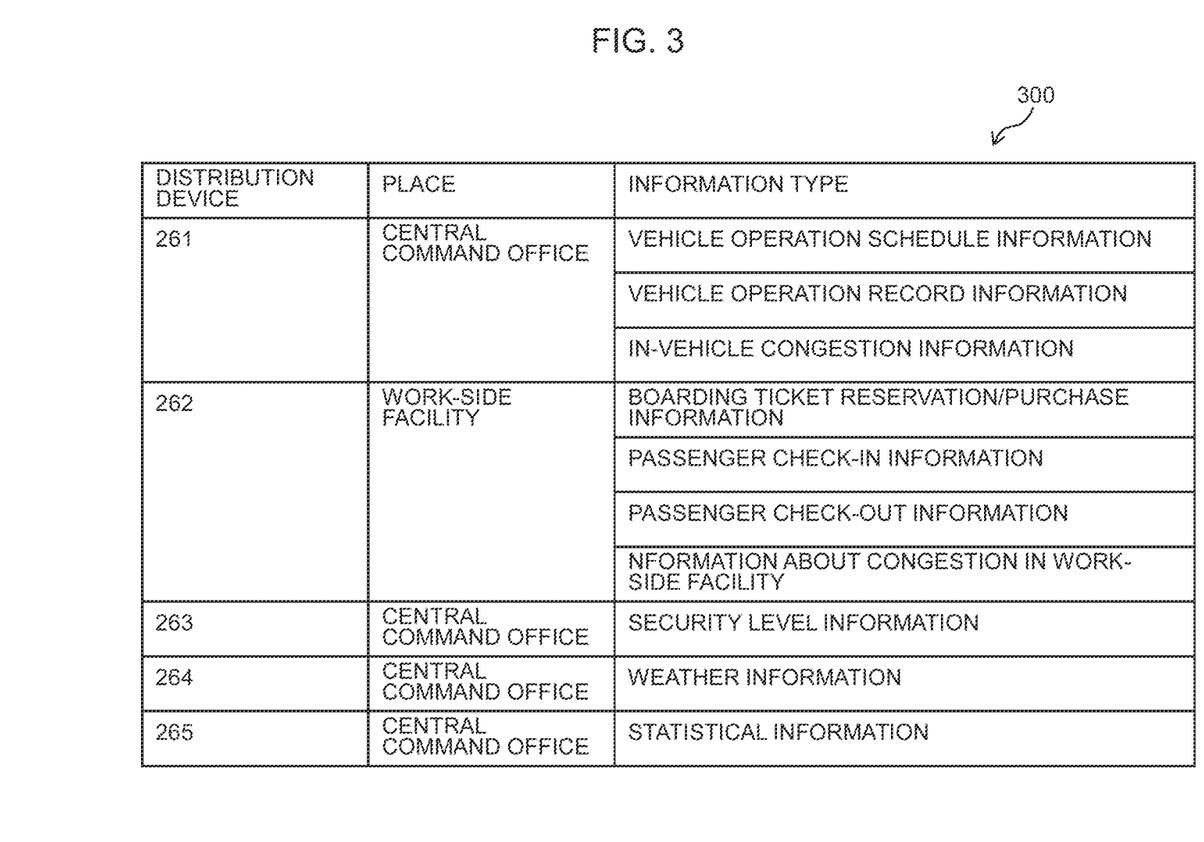
FIG. 3 is a view representing an example of information transmitted from an external system.

FIG. 3 is a view representing an example of information (distribution information 300) transmitted from the external system 204.

The vehicle operation management information distribution device 261 distributes vehicle operation management information. The vehicle operation management information includes vehicle operation schedule information, vehicle operation record information, and in-vehicle congestion information.

The vehicle operation schedule information is exemplified by a timetable. The vehicle operation record information refers to the real-time position information derived from various positioning techniques of the vehicle, for example, GPS (Global Positioning System), medium- to long-distance wireless communication (several m), and short-distance wireless communication (several cm).

The in-vehicle congestion information indicates the congestion level in the vehicle. For example, the in-vehicle congestion information refers to the number of passengers counted at the entry of the vehicle. The number of passengers may be counted manually by a person, by using the infrared laser, or by using the camera sensor. The in-vehicle congestion information indicates a boarding rate in the vehicle. The boarding rate may be measured as the percentage of passengers to the space in the vehicle by using the camera sensor, measured by using the load sensor, or measured based on the number of connected sessions of the public wireless distribution device.

The work-side facility operation information distribution device 262 distributes the work-side facility operation information. The work-side facility operation information includes boarding ticket reservation/purchase information, passenger check-in information, passenger check-out information, and information about congestion in the work-side facility.

The boarding ticket reservation/purchase information refers to the information about the ticket or seat reserved or purchased by the passenger. The passenger check-in information refers to the information indicating passage of the passenger through entrance gate of the airport, port, and station (boarding procedure), the information indicating that the passenger gets on the vehicle such as bus, and the information indicating check-in at the hotel. The passenger check-out information refers to the information indicating passage of the passenger through exit gate of the airport, port, and station, the information indicating that the passenger gets off the vehicle such as bus, and the information indicating check-out at the hotel. The information about congestion in the work-side facility refers to the information indicating the congestion level in the work-side facility, which is similar to the in-vehicle congestion information.

The central command office operation information distribution device 263 distributes the central command office operation information. The central command office operation information is exemplified by the security level information such as the setting information indicating security level of the act committing a crime of a terrorist in the local event to be held.

The weather information distribution device 264 distributes the weather information. The weather information is exemplified by the weather information of the region where each of the respective work-side facilities is located.

The statistical information distribution device 265 distributes the statistical information. The statistical information is exemplified by the accumulation information, for example, the vehicle operation management information and the work-side facility operation information as the information accumulated over the past several years.

Figure 4:
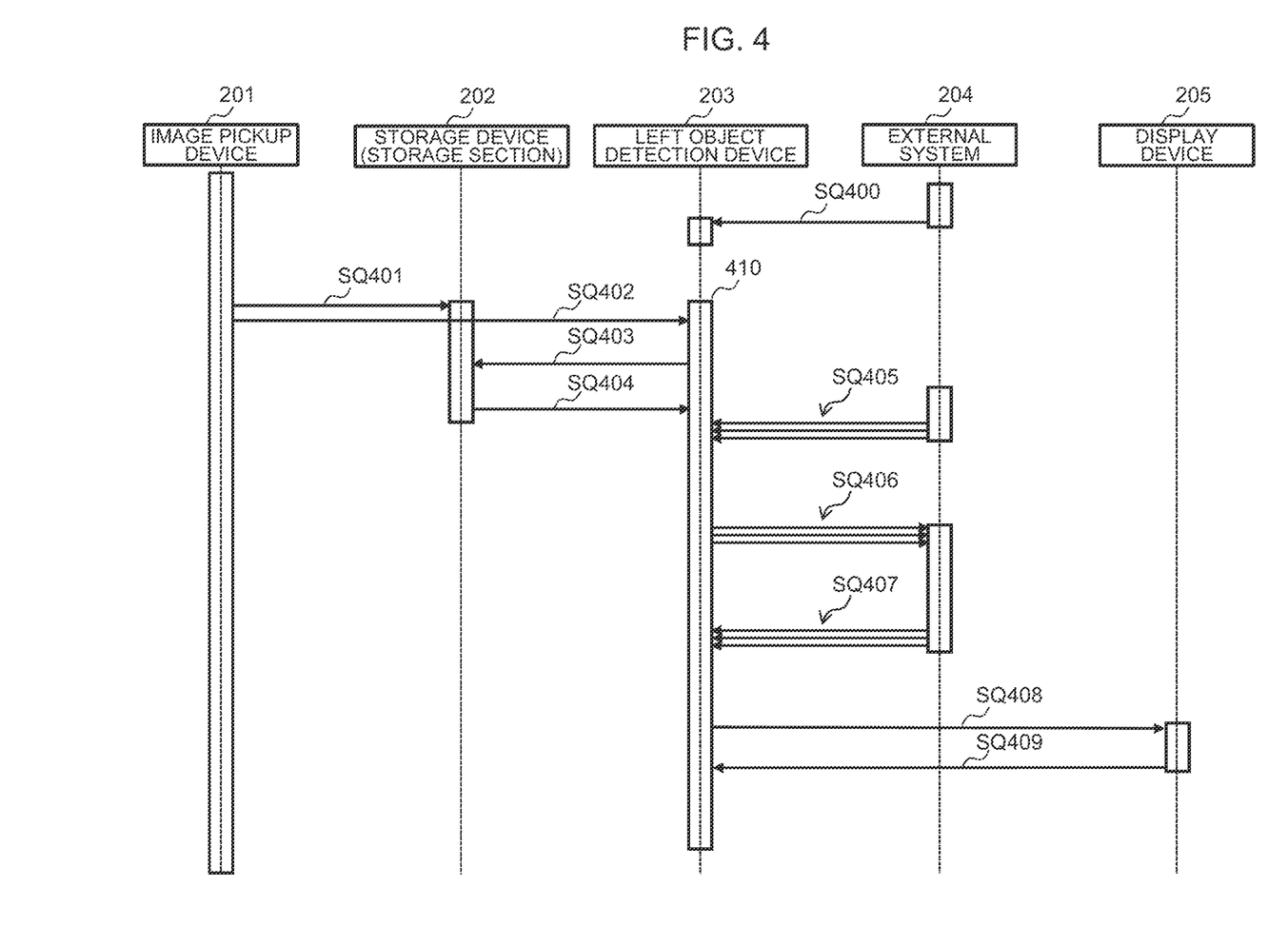
FIG. 4 is a view representing an example of a data flow among devices of the left object detection system.

FIG. 4 is a view representing an example of a data flow among devices of the left object detection system 100.

As FIG. 4 represents, the external system 204 transmits the statistical information to the left object detection device 203 at predetermined timing (for example, the prescribed time once a day) (SQ400).

The image pickup device 201 transmits the picked-up video data successively (real-time) to the storage device 202 (SQ401), and to the left object detection device 203 (SQ402).

In left object detection process 410, the left object detection device 203 requests the video data accumulated in the storage device 202 as needed (SQ403). The storage device 202 transmits the requested video data to the left object detection device 203 (SQ404). The left object detection process 410 will be described later referring to FIG. 5.

The external system 204 regularly transmits the work-side facility operation information to the left object detection device 203 (SQ405).

Meanwhile, the left object detection device 203 requests the external system 204 for the vehicle operation management information in the left object detection process 410 (SQ406). The external system 204 transmits the requested information to the left object detection device 203 (SQ407).

If the left object is detected in the left object detection process 410, the left object detection device 203 transmits the information about the left object (information screen, alarm flag setting information) to the display device 205 (SQ408). The display device 205 transmits the alarm flag release information to the left object detection device 203 in accordance with operations of the user (SQ409).

Figure 5:
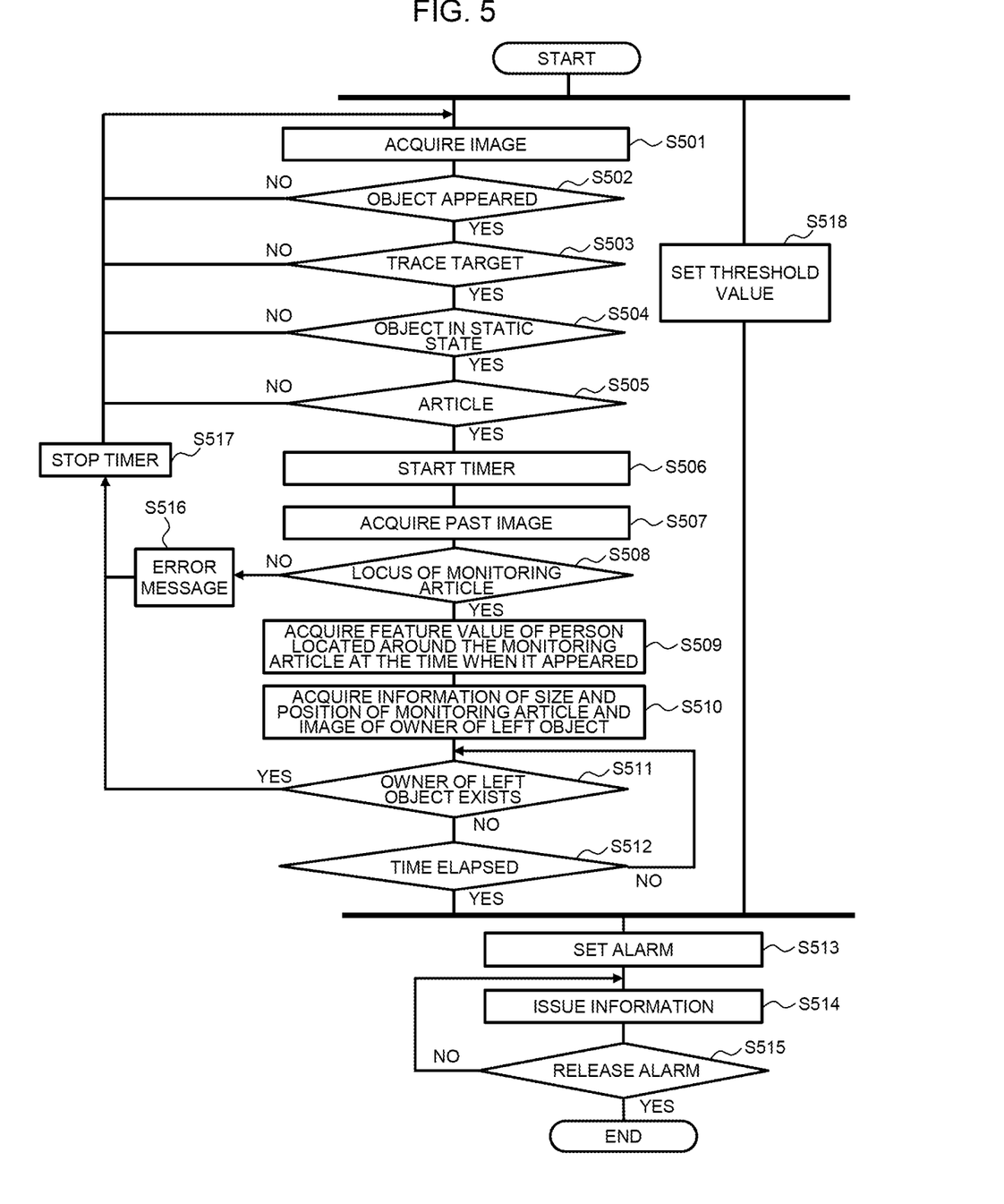
FIG. 5 is an exemplary flowchart of a left object detection process.

FIG. 5 is an exemplary flowchart of the left object detection process executed by the left object detection device 203.

In step SS501, the acquisition section 220 acquires the video data (picked-up image) from the image pickup device 201.

In step S502, the object detection section 231 determines whether or not the object has appeared by implementing the background difference method. If it is determined that appearance has occurred, the object detection section 231 proceeds the process to step S503. If it is determined that there is no appearance, the process proceeds to step S501. If it is determined that a new object (dynamic object) has appeared, the object detection section 231 associates the position information (coordinate information) of the dynamic object in each frame with the identifier (tracing identifier) uniquely imparted to each trace so that the trace information of the newly appeared dynamic object is generated.

The method of detecting the appeared object is not limited to the background difference method. If the moving object detected from the frame to be processed cannot be associated with none of the moving objects detected from the frame at the previous time, the determination may be made by the object detection section 231 that the new moving object has appeared. Additionally, arbitrary method may be implemented for detecting and tracing the moving object as described in such document as SIMON BAKER AND IAIN MATTHEWS "Lucas-kanade 20 years on: A unifying framework", International Journal of Computer Vision, vol. 53, no. 3, 221-255, 2004.

In step S503, the object detection section 231 extracts the size of the object (for example, rectangular size), and determines whether or not the object size coincides with the size of the one to be traced (for example, whether or not it is equal to or smaller than the prescribed object size). If it is determined that the object size is equal to the size of the object to be traced, the object detection section 231 proceeds the process to step S504. If it is determined that the object size is not equal to the size of the one to be traced, the process proceeds to step S501.

The object detection section 231 retains 3D position information in the image calculated based on the calibration information of the image pickup device 201. Based on the retained 3D position information, the object detection section 231 estimates the size of the object reflected in accordance with the position on the image.

When a person is moving while carrying an article, the object detection section 231 recognizes the person and the article as a single object. When the person leaves the article behind (for example, when it is determined that the first object (person) and the second object (article) are separated by a certain distance), the object detection section 231 recognizes them as the individual objects to be traced separately.

In step S504, the object feature value acquisition section 232 determines whether or not a given time period has elapsed during which no displacement of the object occurs (whether or not the object has been kept static in the given time period). If it is determined that the time has elapsed, the object feature value acquisition section 232 recognizes the object as the monitoring object, and proceeds the process to step S505. If it is determined that the time has not elapsed, the process proceeds to step S501.

In step S505, the object feature value acquisition section 232 acquires the feature value of the monitoring object, and determines whether or not the monitoring object is an article. If it is determined that the monitoring object is the article, the object feature value acquisition section 232 proceeds the process to step S506. If it is determined that the monitoring object is not the article, the process proceeds to step S501. In the determination, optical noise is removed.

Additionally, the object feature value acquisition section 232 notifies the object feature value extraction section 241 of the picked-up image of the monitoring object and the position information thereof. The object feature value extraction section 241 extracts the feature value of the monitoring object from the received picked-up image and the position information, and notifies the object feature value acquisition section 232 of the extracted feature value. The object feature value acquisition section 232 acquires the feature value of the monitoring object by executing the above-described process. The object feature value extraction section 241 calculates one or more values (feature values) with respect to each of multiple different pixel features (color, gradation, outline). Calculation (extraction) of the feature value of the object is not limited to the above-described content, but may be executed by implementing the known method.

In step S506, the timer section 238 starts the timer for counting time for which the monitoring object determined as the article (monitoring article) has been left behind.

In step S507, the person feature value acquisition section 233 requests the image accumulation section 210 for picked-up images (past picked-up images) accumulated in a given time period to acquire those images.

In step S508, the person feature value acquisition section 233 determines whether or not the locus of the monitoring article can be confirmed. If it is determined that the locus of the monitoring article can be confirmed, the person feature value acquisition section 233 proceeds the process to step S509. If it is determined that the locus of the monitoring article cannot be confirmed, the process proceeds to step S516.

For example, the person feature value acquisition section 233 traces the monitoring article through the background difference method. The person feature value acquisition section 233 may be configured to trace the monitoring article by dividing the frame into small regions, calculating each motion vector in the respective small regions between frames, and grouping the small regions in which each of the motion vectors has the similar motion. Additionally, arbitrary method other than the above-described method may be employed to trace the monitoring article.

In step S509, the person feature value acquisition section 233 acquires the feature value of the person located around the monitoring article at the time when it appeared.

Additionally, the person feature value acquisition section 233 notifies the person feature value extraction section 242 of the picked-up image and the position information of the monitoring article. The person feature value extraction section 242 extracts the feature value of the person located around the monitoring article from the received picked-up image and the position information, and notifies the person feature value acquisition section 233 of the extracted information. The person feature value acquisition section 233 acquires the feature value of the person by executing the process. For example, the person feature value extraction section 242 detects feature regions (head region, face region, and the like) exhibiting features (head, face, and the like) of the person from the picked-up images so that the feature value of the feature region is calculated. Calculation (extraction) of the feature value of the person is not limited to the above-described content, but may be executed by implementing the known method.

In step S510, the identification section 234 identifies the person having the acquired feature value as the person who owned the left object, and acquires the picked-up image of the owner of the left object, the size information of the monitoring article, and the position information of the monitoring article.

In step S511, the identification section 234 acquires the feature value of the person located around the monitoring article from the picked-up images (real-time video data) successively transmitted by the image pickup device 201, and collates the acquired feature value with that of the owner of the left object to determine whether or not those values match. If it is determined that those values match with each other, the identification section 234 proceeds the process to step S517. If it is determined that those values do not match, the process proceeds to step S512.

For example, the identification section 234 calculates the distance between the feature value of the person located around the monitoring article and that of the owner of the left object. If the calculated distance is shorter than a predetermined distance, it is determined that those values match with each other.

The identification section 234 may be configured to recognize the person located around the monitoring article as the object that exists within the predetermined range (distance) from the monitoring article, or as the object approaching the monitoring article to be in the predetermined range.

In step S512, the determination section 236 determines whether or not the timer count has exceeded the predetermined threshold value. If it is determined that the timer count has exceeded the predetermined threshold value, the determination section 236 determines that the monitoring article is the left object, and proceeds the process to step S513. If it is determined that the timer count has not exceeded the predetermined threshold value, the process proceeds to step S511.

In step S513, the determination section 236 sets the alarm flag.

In step S514, the generation section 237 generates progress information based on the determination results in the determination section 236, and notifies the output section 250 of the generated progress information. The output section 250 generates screen information (for example, alarm screen) for displaying the information about the person feature value (for example, attribute information of the person) acquired in the determination section 236 based on the progress information generated in the generation section 237, and transmits the information to the display device 205. The display device 205 displays the alarm screen. The alarm screen will be described later referring to FIG. 7.

In step S515, the timer section 238 determines whether or not an instruction (release instruction) for releasing the alarm by the user (for example, commanding staff) has been received from the display device 205. If it is determined that the release instruction has been received, the timer section 238 stops execution of the left object detection process. If it is determined that such instruction has not been received, the process proceeds to step S514.

In step S516, the generation section 237 generates an error message, and notifies the output section 250 of the generated error message. The output section 250 generates the screen information (error screen) indicating the error message, and transmits the information to the display device 205. The display device displays the received error screen.

In this case, the process may be executed to detect all objects which are kept static in the time period in excess of the predetermined time in the monitoring area as the left objects. The process of this type may cause the problem of excessive alarming.

In the embodiment, accuracy of detecting the owner of the left object as well as the left object is improved by identifying the owner of the left object by tracing the monitoring article retroactively to the past picked-up images. Meanwhile, it is determined whether or not the owner of the left object is located around the monitoring article. If a predetermined time period has elapsed in the absence of the owner of the left object, it is determined that the monitoring article is the left object. This makes it possible to reduce the excessive alarming.

In step S517, the timer section 238 stops (or initializes) the timer to proceed the process to step S501.

In step S518, based on the information to be transmitted periodically or in response to the request from the external system 204, the setting section 235 dynamically sets a predetermined threshold value indicating the time period elapsing from identification of the left object until generation of the alarm.

Specifically, upon reception of the operation record information from the vehicle operation management information distribution device 261, the setting section 235 calculates the operation interval of the vehicle that departs from or arrives at the boarding stop from the operation record information, and sets the predetermined threshold value in accordance with the operation interval calculated from the position information of the respective vehicles.

For example, the setting section 235 sets the value that is a prescribed multiple of the vehicle operation interval at each boarding stop to the threshold value (if the operation interval is 3 minutes, the threshold value is set to 6 minutes that is twice the interval).

If the operation interval is set to a first value (for example, 10 minutes), the setting section 235 sets a threshold value corresponding to the first value (for example, 10 minutes). If the operation interval is set to a second value smaller than the first value (for example, 5 minutes), the setting section 235 sets a threshold value corresponding to the second value (for example, 5 minutes). If the operation interval is set to a third value larger than the first value (for example, 15 minutes), the setting section 235 sets a threshold value corresponding to the third value (for example, 15 minutes). The threshold value may be equal to or larger than the operation interval.

The thus set predetermined threshold value allows detection of the left object adapted to the case in which the object is left behind by its owner while riding on the vehicle.

Upon reception of the congestion information of the work-side facility from the work-side facility operation information distribution device 262, the setting section 235 sets a predetermined threshold value in accordance with the congestion level of the congestion information.

If the congestion level is in the first range (for example, less than 30%), the setting section 235 sets the first threshold value (for example, 10 minutes). If the congestion level is in the second range hither than the first range (for example, from 30% or more to less than 60%), the setting section 235 sets the second threshold value (for example, 5 minutes). If the congestion level exceeds the upper limit value (for example, 90% or more), it is determined that the left object cannot be detected. In this case, the information about interruption of monitoring the monitoring article may be notified to terminate the process.

Upon acquisition of the congestion information indicating the congestion level of the monitoring target from the external system 204, the setting section 235 sets the threshold value which is made larger (predetermined time is made longer) as the congestion level of the received congestion information becomes lower.

When setting the predetermined threshold value, if the congestion level is relatively low, the longer time is set to the predetermined threshold value. If the congestion level is relatively high, the shorter time is set to the predetermined threshold value. It is therefore possible to detect the left object in accordance with the degree of influence of the left object (for example, influence of the left object as obstruction to passage, and influence of dangerous object on surroundings.

Figure 6:
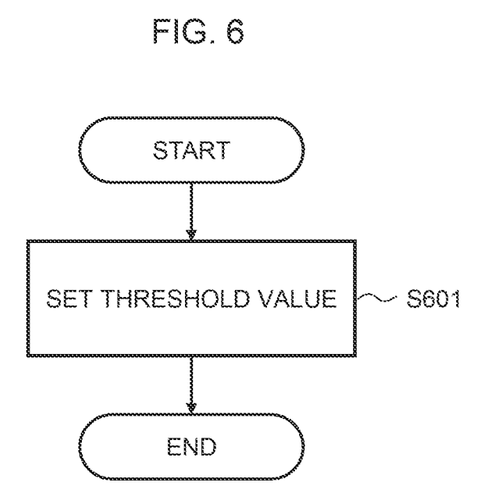
FIG. 6 is an exemplary flowchart of a threshold value setting process.

FIG. 6 is an exemplary flowchart of the process for setting the predetermined threshold value (threshold value setting process).

In step S601, based on the information transmitted from the external system 204 at predetermined timing (for example, at a prescribed time once a day), the setting section 235 sets the predetermined threshold value.

Specifically, upon reception of the vehicle operation management information from the statistical information distribution device 265, the setting section 235 estimates the daily operation interval for each day of the week, each time zone, and each boarding stop based on the vehicle operation management information so that the predetermined threshold value is set in accordance with the estimated operation interval. In the case where the operation intervals on the weekends and statutory holidays for all the boarding stops are longer than those on the weekdays, a relatively large value may be set to the predetermined threshold value. In the case of the relatively shorter operation interval in the commuting hours, a relatively small value may be set to the predetermined threshold value. In the case of relatively long operation interval for the boarding stop at which the vehicle does not stop in a certain time zone in the daytime, a large value may be set to the predetermined threshold value.

The predetermined threshold value may be set for each day of the week, each time zone, each boarding stop, and arbitrary combination thereof in accordance with the operation interval. Compared with the use of the fixed threshold value, the left object can be detected at more appropriate timing.

Upon acquisition of the statistical information indicating the congestion level of the monitoring target from the statistical information distribution device 26, the setting section 235 calculates the congestion level for each day of the week, each time zone, each boarding stop, and arbitrary combination thereof. The threshold value is then set to be larger (predetermined time is made longer) as the calculated congestion level becomes lower.

The predetermined threshold value may be set for each day of the week, each time zone, each boarding stop, and arbitrary combination thereof in accordance with the congestion level. Compared with the use of the fixed threshold value, the left object can be detected at more appropriate timing.

Upon reception of the security level information from the central command office operation information distribution device 263, the setting section 235 sets an initial value to the predetermined threshold value in accordance with the security level. If the security level is at the first level, the setting section 235 sets the first threshold value (for example, 10 minutes). If the security level is at the second level higher than the first level, the setting section 235 sets the second threshold value (for example, 5 minutes). If the security level is at the third level lower than the first level, the setting section 235 sets the third threshold value (for example, 15 minutes).

The predetermined threshold value allows detection of the left object adapted to the case in which the event is held.

Figure 7:
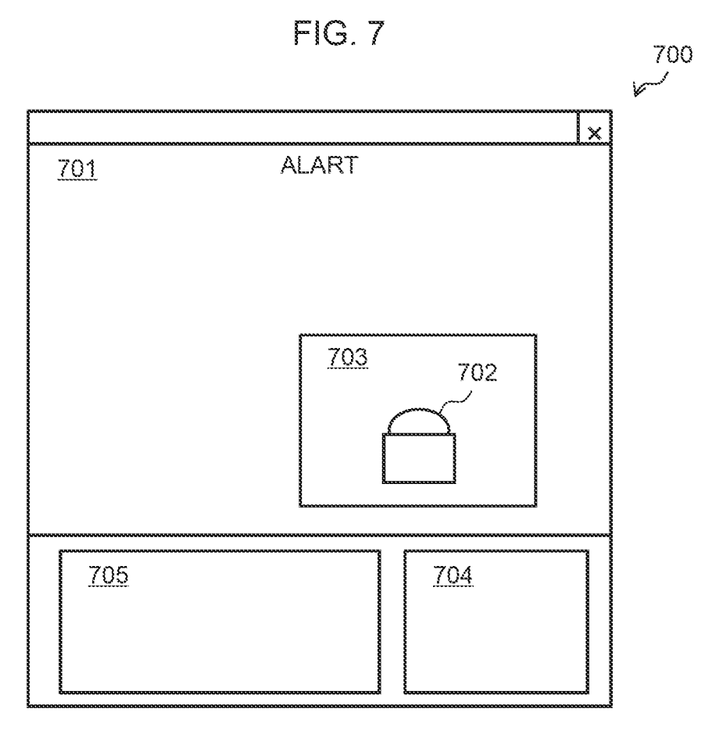
FIG. 7 illustrates an example of an alarm screen.

FIG. 7 illustrates an example of an alarm screen (screen 700).

The screen 700 includes a region 701 for displaying the real-time video image, a region 703 displayed corresponding to a left object 702, a region 704 for displaying an image of the owner of the left object, and a region 705 for displaying attributes of the owner of the left object.

In the region 703, the left object 702 is highlighted by displaying an enclosing line, flashing the enclosing line and/or the region, displaying the enclosing line and/or the region in variable colors, illuminating the region, or displaying the text. The time when the object was left behind, or the elapsed time from the act of leaving the object behind may be displayed in the region 703.

The region 703 allows the commanding staff to quickly and accurately locate the left object 702. The real-time video image displayed on the screen 700 allows the commanding staff to easily locate the left object.

In the region 705, attributes of the owner of the left object are displayed, for example, the one having a red hat on, the one in black, and the like.

The region 703 allows the commanding staff to confirm the attribute of the owner of the left object, resulting in easy identification of the owner of the left object.

The embodiment allows lowering of non-detection probability and excessive detection probability upon detection of the left object, resulting in improved accuracy of the left object detection.

(2) Other Embodiment

In the embodiment which has been described so far, the present invention is applied to the left object detection device. The present invention is broadly applicable to various types of systems, devices, methods, programs, and program readable/writable recording media without being limited to the one as described above.

In the embodiment which has been described so far, the use of the display device 205 for displaying the alarm screen is described as the method for outputting existence of the left object. Arbitrary methods can be implemented without being limited to the one as described above by operating the alarm device (for example, lamp, speaker), using a not shown projection device for projection, using a not shown printing device for printing, calling the prescribed phone, or whatever.

In the embodiment, an explanation has been made with respect to detection of the object kept static for a given time as the monitoring object. The present invention is not limited to the one as described above. The processing section 230 may be configured to determine whether or not the first object and the second object, which are divided from the appeared object have been separated by a predetermined distance. If it is determined that those objects have been separated, the static one either the first object or the second object may be detected as the monitoring object. In this case, the processing section 230 may be configured to manage the time when the first and the second objects were separated in association with the monitoring object. The processing section 230 may be configured to acquire the past picked-up image using such time.

In the embodiment, the image accumulation section 210 is requested for the picked-up images accumulated in a given time period. The present invention is not limited to the one as described above. It is also possible to acquire those images by returning to the time point when the monitoring article appeared in the monitoring area retroactively.

In the embodiment, the image pickup device transmits the picked-up video data of the installation area. The present invention is not limited to the one as described above. The image pickup device may be installed in a mobile body such as a drone and a robot to transmit the video data picked up by the image pickup device in association with movement of the mobile body.

In the embodiment, the "storage section" is constituted by at least one of the memory section, and at least a part of the PDEV section (typically, at least the memory section).

The "memory section" is constituted by one or more memories, typically, as the main storage device. At least one memory of the memory section may be either the volatile memory or the non-volatile memory.

The "PDEV section" is constituted by one or more PDEVs, typically as an auxiliary storage device. The "PDEV" represents the physical storage device, typically, the non-volatile storage device, for example, HDD (Hard Disk Drive) or SSD (Solid State Drive).

In the embodiment, the "processor section" is constituted by one or more processors. At least one processor is typically a microprocessor such as the CPU, but may be of other type like GPU (Graphics Processing Unit). At least one processor may be of single-core type or multi-core type. At least one processor may be constituted by a hardware circuit for partially or entirely executing the process (for example, FPGA (Field-Programmable Gate Array)), or ASIC (Application Specific Integrated Circuit) in the broad sense.

In the embodiment, the explanation has been made on the assumption that the "program" executes the process as a subject of processing. Since the processor section is configured to perform the specified process by executing the program suitably using the storage section (for example, memory) and/or interface section (for example, communication port) or the like, the processor may be regarded as the subject of processing. The process executed by the program in the description may be regarded as the one to be executed by the processor section or the device provided therewith. The processor section may be configured to include the hardware circuit (for example, FPGA or ASIC) for executing the process partially or entirely. The program may be installed in such device as the computing machine from the program source. The program source may be the program distribution server or the computer readable/writable recording medium (for example, non-temporal recording medium). In the following explanations, two or more programs may be implemented as the single program, or the single program may be implemented as two or more programs.

As described above, the information including programs for implementing the respective functions, tables, and files may be installed in the storage device such as the memory, hard disk, and SSD (Solid State Drive), or the recording medium such as IC card, SD card, and DVD.

The present invention includes characteristic structures as described below.

(i)

The left object detection device (for example, left object detection device 203) or a left object detection system (left object detection system 100) for detecting an object left behind in a monitoring target area (for example, facility 101) includes an acquisition section (for example, acquisition section 220) which acquires an image of the area from an image pickup device (for example, image pickup device 201) for picking up an image of the monitoring target area, a processing section (for example, processing section 230), and an output section (for example, output section 250) which outputs in accordance with a result of the processing section. Upon detection of the object which has been kept static for a given time period as an article from the image acquired by the acquisition section, the processing section starts a timer for counting time from detection of the article, determines whether or not a person who owned the article matches a person in the image acquired by the acquisition section, stops the timer upon determination that they match, and does not stop the timer upon determination that they do not match. The processing section determines whether or not the timer counts in excess of a predetermined time period. Upon determination made by the processing section that the timer counts in excess of the predetermined time period, the output section outputs an existence of the left object.

In the case where the person located around the monitoring article is not the owner thereof, the timer is not stopped. This makes it possible to avoid overlooking of the left object even in the congested state, lowering the non-detection error.

(ii)

In the left object detection device or the left object detection system according to the paragraph (i), the processing section determines whether or not the person who owned the article matches a person located separately from the article in a given distance among those contained in the image acquired by the acquisition section.

Collation executed with respect to all persons in the congested state enlarges the load. The structure executes collation with respect to only persons within a certain distance so that the collating load can be reduced.

(iii)

In the left object detection device or the left object detection system according to the paragraph (i) or (ii), the processing section detects the object with a predetermined size among those kept static for the given time period as the article.

Monitoring displacements of all objects regarded as articles in the given time period in the congested state enlarges the monitoring load. The structure allows monitoring only of the object with predetermined size as the article so that the monitoring load can be reduced.

(iv)

In the left object detection device or the left object detection system according to any one of the paragraphs (i) to (iii), the processing section acquires images picked up in the given time period from a storage section (for example, storage device 202) for storing images picked up by the image pickup device, and traces the article retroactively to the acquired images to identify the person who owned the article.

The structure allows accurate paring between the monitoring article and the owner thereof (association) by tracing the monitoring article retroactively to the past image, resulting in accurate detection of the left object. The pairing keeps the relation between the person and the article even if they are separated from each other. As the left object can be detected more accurately, it is possible to avoid unnecessary detection so that excessive information can be lessened.

(v)

In the left object detection device or the left object detection system according to any one of the paragraphs (i) to (iv), the processing section regularly receives information about an act of leaving behind from an external system (for example, external system 204), and sets the predetermined time period in accordance with the received information.

The structure serves to dynamically set the predetermined time period in accordance with circumstances so that the left object can be detected more accurately.

(vi)

In the left object detection device or the left object detection system according to the paragraph (v), upon reception of information indicating a vehicle operation interval from the external system, the processing section sets the predetermined time period to be longer as the operation interval of the received information becomes longer.

The structure serves to set the predetermined time period in accordance with the current operation interval so that determination with respect to the left object can be made more appropriately.

(vii)

In the left object detection device or the left object detection system according to any one of the paragraphs (i) to (vii), the processing section receives statistical information about an act of leaving behind from an external system, and sets the predetermined time period in accordance with the received statistical information.

The structure serves to set the predetermined time period in accordance with quantitative properties so that the left object can be detected more accurately.

(viii)

In the left object detection device or the left object detection system according to the paragraph (vii), upon reception of the statistical information indicating a vehicle operation interval from the external system, the processing section calculates the operation interval for each day of the week, each time zone, each boarding stop, and arbitrary combination of them, and sets the predetermined time period to be longer as the calculated operation interval becomes longer.

The structure serves to set the predetermined time period in accordance with the operation interval for each day of the week, each time zone, each boarding stop, and arbitrary combination thereof so that the left object can be detected more accurately.

(ix)

In the left object detection device or the left object detection system according to any one of the paragraphs (i) to (viii), the output section generates screen information for highlighting the left object in the image acquired by the acquisition section, and transmits the generated screen information to a display device (for example, display device 205).

The structure serves to highlight the left object displayed on the display device to allow the commanding staff to quickly and accurately locate the left object.

The structure can be subjected to modification, replacement, combination, and omission within a scope of the present invention.

The structure allows provision of the highly reliable left object detection system.

LIST OF REFERENCE SIGNS

100 left object detection system

The invention claimed is:

1. A left object detection device for detecting an object left behind in a monitoring target area, comprising:
   an acquisition section which acquires an image of the area from an image pickup device for picking up an image of the monitoring target area;
   a processing section, upon detection of the object which has been kept static for a given time period as an article from the image acquired by the acquisition section, the processing section starting a timer for counting time from detection of the article, determining whether or not a person who owned the article matches a person in the image acquired by the acquisition section, stopping the timer upon determination that they match, and not stopping the timer upon determination that they do not match; and
   an output section which outputs in accordance with a result of the processing section, wherein:
   the processing section determines whether or not the timer counts in excess of a predetermined time period;
   upon determination made by the processing section that the timer counts in excess of the predetermined time period, the output section outputs an existence of the left object,
   the processing section regularly receives information about an act of leaving behind from an external system, and sets the predetermined time period in accordance with the received information, and
   upon reception of information indicating a vehicle operation interval from the external system, the processing section sets the predetermined time period to be longer as the operation interval of the received information becomes longer.

2. The left object detection device according to claim 1, wherein the processing section determines whether or not the person who owned the article matches a person located separately from the article in a given distance among those contained in the image acquired by the acquisition section.

3. The left object detection device according to claim 1, wherein the processing section detects the object with a predetermined size among those kept static for the given time period as the article.

4. The left object detection device according to claim 1, wherein the processing section acquires images picked up in the given time period from a storage section for storing images picked up by the image pickup device, and traces the article retroactively to the acquired images to identify the person who owned the article.

5. The left object detection device according to claim 1, wherein the processing section receives statistical information about an act of leaving behind from an external system, and sets the predetermined time period in accordance with the received statistical information.

6. The left object detection device according to claim 5, wherein upon reception of the statistical information indicating a vehicle operation interval from the external system, the processing section calculates the operation interval for each day of the week, each time zone, each boarding stop, and arbitrary combination of them, and sets the predetermined time period to be longer as the calculated operation interval becomes longer.

7. The left object detection device according to claim 1, wherein the output section generates screen information for highlighting the left object in the image acquired by the acquisition section, and transmits the generated screen information to a display device.

8. A left object detection method for detecting an object left behind in a monitoring target area, comprising:
   a first step in which an acquisition section acquires an image of the area from an image pickup device for picking up an image of the monitoring target area;
   a second step in which upon detection of the object which has been kept static for a given time period as an article from the image acquired by the acquisition section, the processing section starts a timer for counting time from detection of the article, determines whether or not a person who owned the article matches a person in the image acquired by the acquisition section, stops the timer upon determination that they match, and does not stop the timer upon determination that they do not match; and
   a third step in which an output section outputs in accordance with a result of the processing section, wherein:
   the processing section determines whether or not the timer counts in excess of a predetermined time period; and
   upon determination made by the processing section that the timer counts in excess of the predetermined time period, the output section outputs an existence of the left object,
   the processing section regularly receives information about an act of leaving behind from an external system, and sets the predetermined time period in accordance with the received information, and
   upon reception of information indicating a vehicle operation interval from the external system, the processing section sets the predetermined time period to be longer as the operation interval of the received information becomes longer.

* * * * *